United States Patent [19]

Kilwin

[11] Patent Number: 4,828,095

[45] Date of Patent: May 9, 1989

[54] INTERNAL OVERLOAD CLUTCH ASSEMBLY

[75] Inventor: Thomas C. Kilwin, St. Louis County, Mo.

[73] Assignee: Unidynamics Corporation, St. Louis, Mo.

[21] Appl. No.: 144,112

[22] Filed: Jan. 15, 1988

[51] Int. Cl.[4] ............................................. F16D 43/20
[52] U.S. Cl. ................................. 192/150; 192/56 R; 192/38; 74/426
[58] Field of Search ............... 192/56 R, 150; 464/36, 464/38, 39; 74/426

[56] References Cited

U.S. PATENT DOCUMENTS

| 1,883,164 | 10/1932 | Vassakos | 464/36 |
|---|---|---|---|
| 3,277,671 | 10/1966 | Winstone et al. | 464/36 |
| 3,817,116 | 6/1974 | Georgieff | 74/426 |
| 3,985,213 | 10/1976 | Braggins | 192/56 R |
| 4,007,818 | 2/1977 | Orwin | 192/56 R |
| 4,255,946 | 3/1981 | Hansen | 192/56 R |
| 4,263,789 | 4/1981 | Koepke et al. | 192/56 R |
| 4,373,923 | 2/1983 | Kilwin | 192/56 R |

FOREIGN PATENT DOCUMENTS

| 44-22328 | 9/1969 | Japan | 192/56 R |
|---|---|---|---|
| 57-204332 | 12/1982 | Japan | 192/56 R |

Primary Examiner—Rodney H. Bonck
Assistant Examiner—David A. Testardi
Attorney, Agent, or Firm—Paul M. Denk

[57] ABSTRACT

An internal overload clutch assembly is provided for connecting rotating and rotatable members during normal operation and for disconnecting same when a maximum predetermined torque is exceeded, all of the operating components being mounted within an enclosed housing and including a rotatable member which is rotatably mounted within the housing and has output means extending outside the housing to perform mechanical operations. A rotating member is rotatably mounted on the rotatable member in the housing and is operatively connected to a power source for predetermined rotational movement thereof. An internal overload clutch assembly cooperates with the rotating and rotatable members within the housing and includes drive and driven collars, the drive collar being attached to the rotating member while the driven collar is attached to the rotatable member, the drive and driven collars being coupled and uncoupled relative to one another through axially shiftable detents which couple the drive and driven collars together during normal operation, while uncoupling the drive and driven collars when an excessive predetermined torque is encountered in performing prescribed mechanical operations outside of the housing.

16 Claims, 3 Drawing Sheets

INTERNAL OVERLOAD CLUTCH ASSEMBLY

BACKGROUND OF THE INVENTION

The present invention relates to an internal overload clutch assembly which permits rotation between a rotating member and a rotatable member during normal operation, but which disconnects the rotating and rotatable members from one another when a maximum torque is exceeded.

In order to couple and uncouple drive shafts from driven shafts, a variety of styles of torque overload clutches or couplings have been developed. While prior art developments in torque overload clutches has been extensive, they can be generally described according to their construction and operation. Many of these clutch or coupling devices are in the category of flexible couplings which provide transmission of the driving or rotational or torque force from a drive shaft to the intended driven shaft, but which are capable of disconnection when a binding force creates an excessive torque causing significantly reduced turning of a mechanical operator on a work component. In certain cases, the flexible couplings are provided with safety features which prevent excessive torque forces on the driven shaft from damaging the drive means and/or its prime mover. Many of the safety devices employed in flexible couplings include magnetically activated torque coupler devices as shown, for example, in U.S. Pat. No. 2,771,171. Another variety of magnetic coupling-clutch devices is shown in U.S. Pat. Nos. 3,221,389 and 3,339,819 which use mechanical elements that engage/disengage relative to one another, together with permanent magnets. Further types of magnetic torque limiting devices used in low force operating mechanisms, such as phonograph record players or sound recorders, are shown in U.S. Pat. Nos. 1,136,739 and 2,300,778. Other types of magnetic couplers include those which have spring biasing to determine the degree of force necessary for disengaging the coupling as shown in U.S. Pat. No. 3,053,365. Other forms of connectors which have utilized permanent magnet designs for effecting torque control are shown in U.S. Pat. Nos. 3,277,669, 3,159,725, 2,943,216 and 2,885,873; and those types of magnetic couplers which use a frictional connection between magnets to determine the degree of torque necessary to effect uncoupling of the torque limiting device as shown, for example, in U.S. Pat. No. 2,746,691.

In addition to magnetic coupler designs, various mechanical coupling devices, using ball detent couplings for holding driving and driven parts together until separated by excessive torque are shown in U.S. Pat. Nos. 3,701,404, 3,680,673, 3,893,553, 3,981,382, 3,979,925, 3,942,238, 3,927,537, 3,930,382 and 3,866,728. Some mechanical coupling devices employ ball-bearing type means as the coupling/uncoupling element such as shown in U.S. Pat. Nos. 1,833,164, 3,722,644 and 3,774,738. Other types of power transmitting mechanisms having flexible couplings therein are shown in U.S. Pat. Nos. 1,541,489, 1,566,553, 2,818,712, 3,050,965, 3,148,499, 3,942,337, 4,006,608 and 4,046,237.

Along with the aforementioned prior art categories, there is yet another category which has been developed by inventors employed by the assignee of the present invention. In U.S. Pat. Nos. 4,174,621 and 4,373,923, this particular type of mechanical torque limiting overload coupling/clutching device has been disclosed. In both of these patents, an improved style of overload torque coupler/clutch device has been developed in that suspended ball detents are used to interconnect rotating and rotatable members during normal operation, but upon encountering an excessive torque force on the rotatable member, suspended ball detents are shifted against a resilient spring out of seating engagement to disconnect the rotating and rotatable members. This improved style of torque limiting overload coupling minimizes rotational back lash or looseness, while maintaining precision operation of the rotatable member. In addition, a more precise and consistent de-coupling of the assembly is provided when a trip torque is encountered, and significant damage to the ball detents has been minimized Such torque limiting overload coupling devices have been particularly useful in conjunction with cam indexing systems such as shown in U.S. Pat. No. 3,817,116, for example, which is also assigned to the same assignee of the present invention. The construction and operation of such cam operation systems include the use of radially mounted cam followers which are indexed by specifically designed multi-ribbed cams. The cam surfaces engage cam followers mounted on a hub to provide accurate positioning, while allowing clearance between adjacent cam followers Mechanical torque limiting overload couplings which have been employed in conjunction with such cam indexing systems, have been operated as separate components, separate from, but operative with such systems. Thus, a typical set up would include a cam index system, with or without a separate speed reducer, and also a separately mounted torque limiting overload coupling which is mounted outside the housing of the cam index system, but which couples/uncouples the output driven shaft or flange thereof, to connect and disconnect the drive shaft or prime mover when an excessive torque is encountered.

In certain industries, however, it is necessary to expose all of the aforementioned mechanical components and driving systems to daily cleaning. In the dairy industry, for example, the incidence of salmonella poisoning or other contamination requires daily washing of operating machine components, and this subjects the operating machine components to unnecessary exposure to moisture and deterioration, even though stainless steel may be used in the construction thereof. This has created a need for a self enclosed torque limiting clutch assembly which is contained in the same housing as the indexing system or prime mover. While it may appear at first sight that this would not require extensive engineering design and improvement, in view of the highly developed nature of the prior art in this field, in actual fact; however, the development of the present invention did not come easily. Numerous designs were conceived and tested, some including magnetic coupler devices, but were unsuccessful Only after much development and testing was the present invention created For the reasons which will become apparent in the ensuing description, the internal overload clutch assembly of the present invention is a substantial advance over prior art developments and enjoys numerous advantages and features which will be understood by those skilled in the art.

Accordingly, it is an object of the present invention to provide an internal overload clutch assembly for connecting rotating and rotatable members together during normal operation and for disconnecting rotating and rotatable members when a maximum predetermined torque is exceeded.

Another object of the present invention is to provide an internal overload clutch assembly which is totally contained by and housed within the same housing also containing the prime mover, such as a cam indexing system, for protection and safety to the prime mover and the internal overload clutch assembly associated therewith.

Still another object of the present invention is to provide an internal overload clutch assembly which is mounted between drive and driven shafts/means, all of which are contained within the same housing, to provide a self contained unit which operates in a confined space with minimum components;

A further object of the present invention includes a provision of an internal overload clutch assembly which employs non-axially moving drive and driven means that connect and disconnect from one another, while minimizing rotational looseness or back lash; provides precision positioning of the work component relative to a work piece; and performs consistently in tripping when a excessive predetermined torque has been reached; and Yet still another object of the present invention is to provide an internal overload clutch assembly which contains a minimum number of working components that cooperate with a prime mover in a single housing construction; has a rugged and uncomplicated design; and also insures positive connection/disconnection of drive and driven means in performing prescribed mechanical operations outside of the housing These and other objects will become more apparent to those skilled in the art in light of the following summary, and the description of the preferred embodiment when read in view of the accompanying drawings

SUMMARY OF THE INVENTION

Briefly stated, the present invention relates to an internal overload clutch assembly which connects rotating and rotatable members together during normal operation and for disconnecting the rotating and rotatable members when a maximum predetermined torque is exceeded. The rotating member may include the prime mover, such as a cam indexing system or the like, for imparting rotation to a driving shaft, while the rotatable member transmits the power and force to a mechanical component performing prescribed mechanical operations. In the same housing containing all of the components, the rotatable member is rotatably mounted within the enclosed housing and has output means (either shaft or flange work components) extending outside of the housing for performing the prescribed mechanical operations that may be desired. The rotating member is rotatably mounted on the rotatable member in the enclosed housing and is operatively connected to a power source for predetermined rotational movement. In order to provide the desired coupling/uncoupling of the rotating and rotatable members, an internal overload clutch assembly is mounted for cooperation with the rotating and rotatable members within the housing. The internal overload clutch assembly includes drive and driven means, with the drive means being attached to the rotating member and the driven means being attached to the rotatable member. While the drive and driven means remain in fixed position, an axially shiftable detent mechanism couples the drive and driven means together during normal operation to allow the rotating member to simultaneously turn the rotatable member.

When the rotatable member encounters an excessive predetermined torque in performing prescribed mechanical operations outside of the enclosed housing, the axially shiftable detent mechanism also uncouples the drive and driven means from one another. The internal overload clutch assembly including the drive and driven means is interposed between the rotating and rotatable members to provide a closely positioned construction minimizing components involved, while affording positive connection/disconnection of the components employed. One of the drive and driven means employ bearing detent means which cooperate with detent seats provided in the other of said drive and driven means to achieve the desired coupling/uncoupling. Resilient means in the form of disk springs and thrust bearing means normally transfer the biasing force from the resilient means to the bearing detent means during the actual shifting shifting and disengagement of the detent means from the cooperating detent seats when a predetermined excessive torque is reached. In this way, precisely controlled motion during coupling and uncoupling, with a minimum of back lash or looseness in the components, is achieved In lieu of ball-bearings, roller bearing detents are employed, and the design of the roller bearing detents and their cooperation with detent seats can be incorporated to afford positive driving connections, while affording quick disconnection when a maximum predetermined torque is exceeded. The mounting and inter-relationship of the components relative to one another and within the housing has also been substantially improved through the cooperation of inter-engaging components and/or bearing mounts relative to one another and the enclosed housing. Thus, the unique construction of the inter-related components of the present invention provides new and improved designs, constructions and advantages which have heretofore been unavailable, until the development of the present invention.

DESCRIPTION OF THE PREFERRED EMBODIMENT

Figure 1:
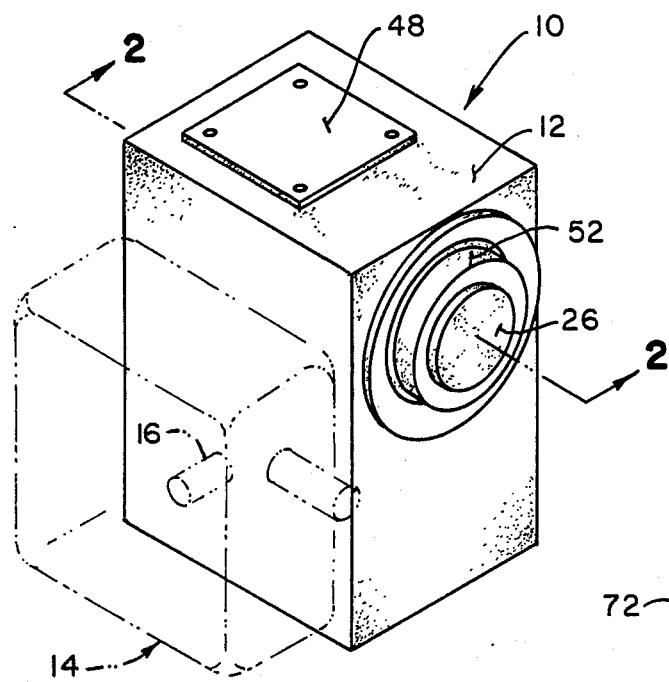
FIG. 1 is an isometric view of a combined prime mover/internal overload clutch assembly mounted within the same housing as constructed in accordance with the present invention, shown together with a separately mounted speed reducer, the latter being shown in phantom line.
Figure 3:
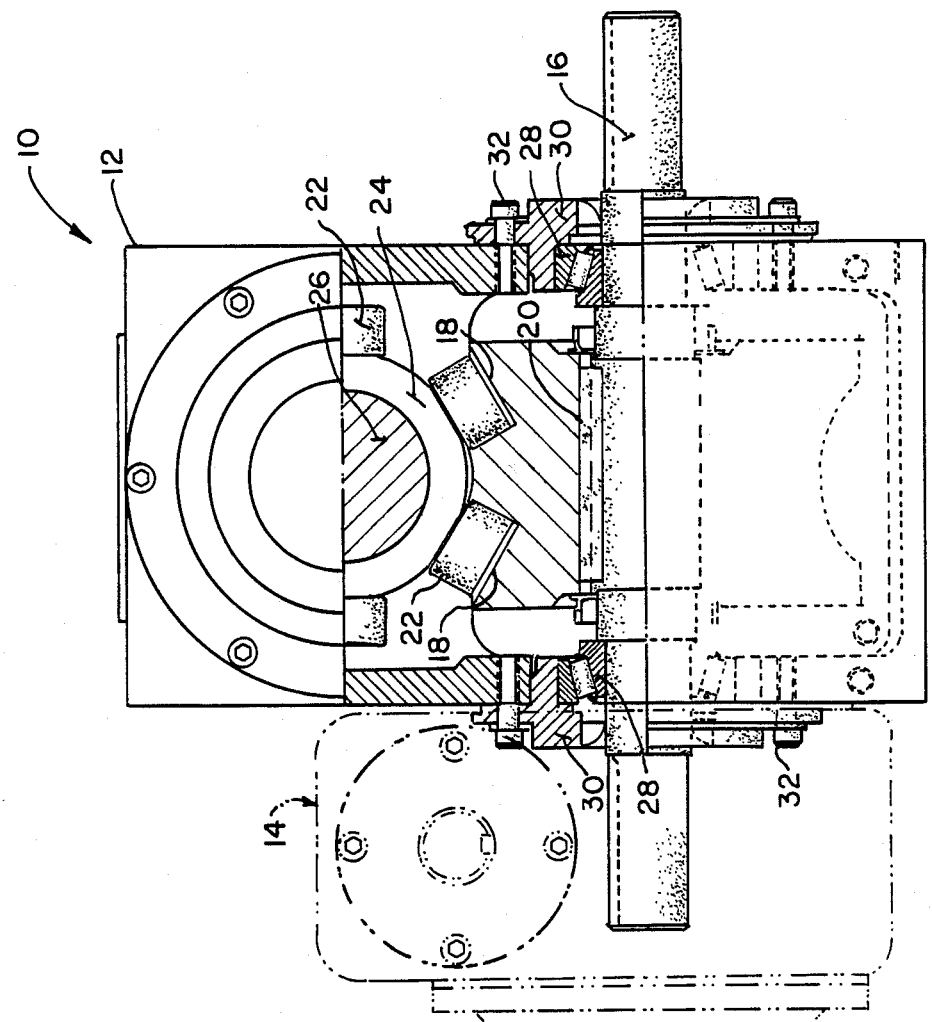
FIG. 3 is also a front elevational view, partly in section, showing the construction of the prime mover and the manner which it cooperates with the speed reducer.
Figure 2:
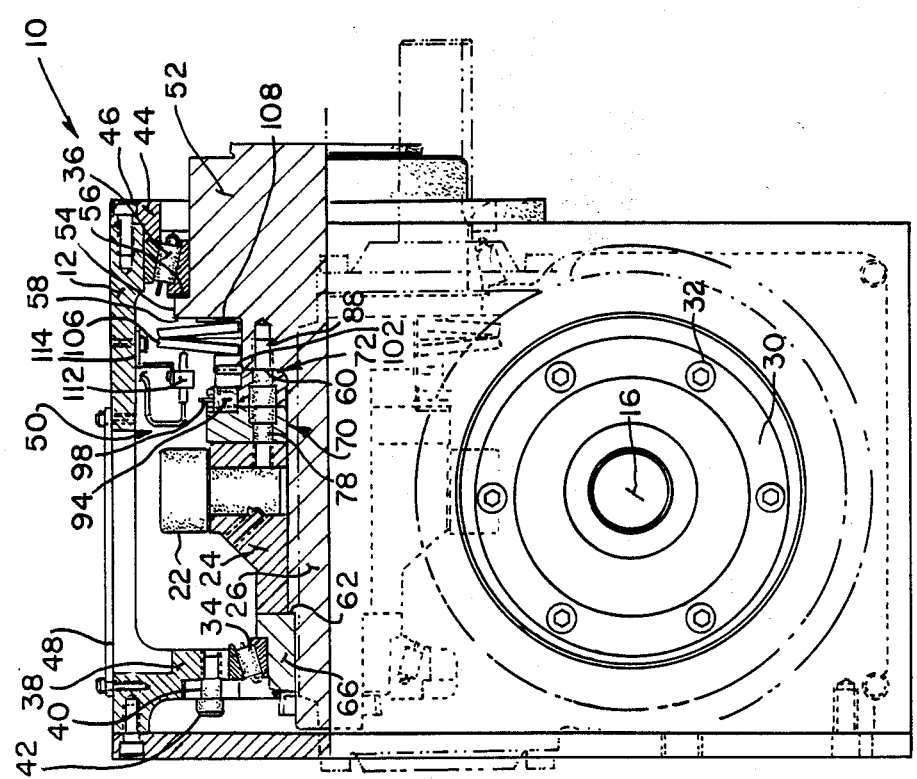
FIG. 2 is a side elevational view, partly in section, showing the combined prime mover/internal overload clutch assembly construction of the present invention as taken along lines 213 2 of FIG. 1.

Reference is now made to FIGS. 1-3 of the drawings which shows the combined prime mover component-/internal overload clutch assembly 10, both mounted within the enclosed housing 12, and a speed reducer 14 associated wherewith. The prime mover (not shown) is usually in the form of an electrical motor and drives the cam shaft 16, through the speed reducer 14, to rotate the multi-ribbed cams 18, 18 which are secured to the cam shaft 16 by the cam shaft keys 20. The cams 18, 18 sequentially engage the roller gears 22 which are affixed to a hub 24 that is rotatably mounted on an elongated shaft 26 to index the roller gears 22 as described in aforementioned U.S. Pat. No. 3,817,116. This patent discloses an indexing cam for a roller gear drive mechanism similar to that shown herein. Obviously, rotational force may be imparted to the rotating mechanism, here shown as the roller gears 22 for turning the elongated shaft 26, by any other drive mechanism, including a variety of prime mover connections. It will be further understood that the roller gears 22, constituting the rotating mechanism of the disclosed embodiment, are described as part of the prime mover component, to aid in understanding the invention. Technically speaking, the indexing roller gears 22 are not generally considered as part of the prime mover; however, they are an extension/connection to the prime mover (not shown), and since they are referred to as the rotating member in the disclosed embodiment, for ease of understanding, they have been referred to as part of the prime mover component.

Since the prime mover (not shown), roller gear drive mechanism including the cam shaft 16 and the roller gears cam 18, and the speed reducer 14 form no part per se of the present invention, they are shown generally by phantom lines throughout the drawings, except where full line representation is necessary to aid in understanding the present invention. To understand the location of the various components within the housing 12, it will be noted that the cam shaft 16 is mounted in cone bearings 28 which are mounted to the housing through the flange bushings 30 that are secured to the housing 12 through the threaded fasteners 32 as best seen in FIGS. 2-3 of the drawings The cam shaft 16 is thus mounted in a lower portion of the housing 12 as shown in FIGS. 2-3.

As best seen in FIG. 2, the elongated shaft 26 is mounted within the upper end of the housing 12 and journaled within the cone bearings 34, 36 at opposite ends thereof The cone bearing 34 is clamped to the inside housing extension 38 by the bearing clamp 40 which is secured by the threaded fasteners 42 to the inside housing extension 38 of the housing 12 At the opposite end of the housing 12, the cone bearing 36 is secured by the bearing clamp 44 which is attached by the threaded fasteners 46 to the housing 12 as shown. As will be described in detail hereinafter, the cone bearings 34, 36 provide opposing angular bearing support to the elongated shaft 26 for rotatable journal mounting within the housing 12. The housing 12 further includes an access cover 48 which is secured to the housing 12 by threaded fasteners and can be removed to expose the internal overload clutch assembly generally identified at 50, now to be described in greater detail.

Figure 4:
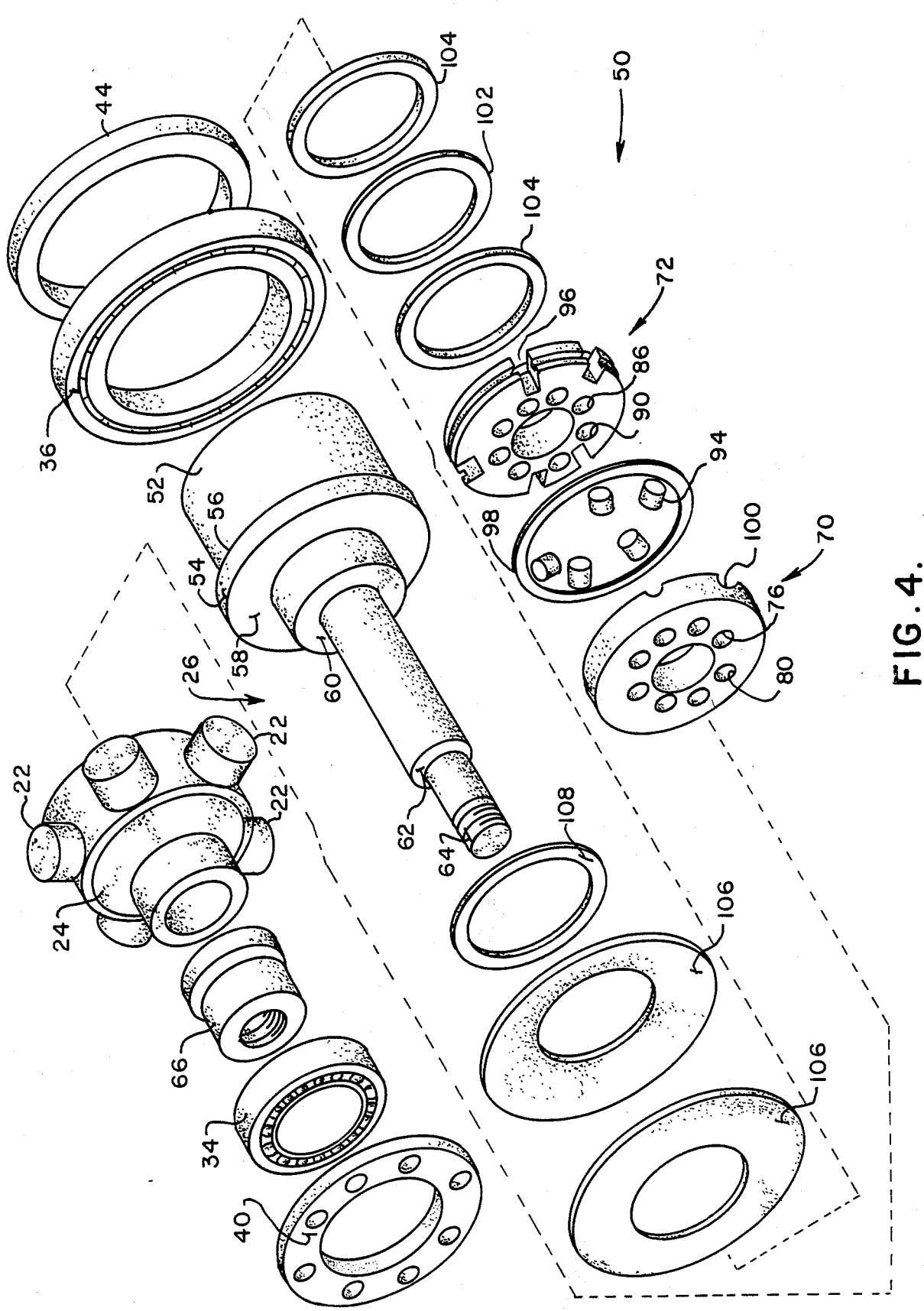
FIG. 4 is an exploded isometric view showing the construction of the various components constituting the internal overload clutch assembly of the present invention.

As discussed above, the internal overload clutch assembly 50 is designed to connect rotating and rotatable members together during normal operation and for disconnecting the rotating and rotatable members when a maximum predetermined torque is exceeded, such as may occur when the output means of a rotatable member encounters an excessive predetermined torque in performing prescribed mechanical operations outside of the housing 12. As best shown in FIGS. 2 and 4, the internal overload clutch assembly 50 includes a rotating member or mechanism which is here shown as the roller gear 22 of the cam indexing system heretofore described. The roller gears 22 are mounted on the hub 24 which is rotatably indexed as the roller gears 22 are incrementally indexed by the cam indexing system. It will be noted that the hub 24 is capable of rotation with respect to the elongated shaft 26 In describing the present invention, the roller gear 22 and hub 24 are considered to be the rotating member which is rotatable mounted on the elongated shaft 26, while the elongated shaft 26 itself is considered to be the rotatable member. Thus, the internal overload clutch assembly 50 is arranged to interconnect the roller gear 22 and its hub 24 to the elongated shaft 26 during normal operation and for disconnecting the roller gear 22 and its hub 24 from the elongated shaft 26 when a maximum predetermined torque is exceeded. The elongated shaft 26 has an output shaft extension 52 which is connected by suitable means such as a shaft extension (not shown) or a flange to a work component that performs prescribed mechanical operations on a work piece, or has work performed upon it, as is well known.

From the enlarged output means 52 at one end thereof, the shaft 26 includes a series of circumferentially extending and radially outwardly directed shoulders of different diameter Adjacent the enlarged output means 52, a first shoulder or flange portion 54 is provided, the outside surface 56 of which engages the cone bearing 36, thereby supporting the cone bearing 36 between the outside surface 56 of the first shoulder or flange 54 and the bearing clamp 44 attached to the housing 12, as seen in FIG. 2. The inside surface 58 of the first shoulder or flange 54 engages disk springs, for purposes which will be discribed hereinafter. The elongated shaft 26 further includes a second circumferentially extending and radially outwardly directed shoulder 60 which engages components of the internal overload clutch assembly 50, also to be described hereinafter A third much smaller in diameter circumferentially extending and radially outwardly directed shoulder 62 is provided together with a threaded end 64 at an end opposite from the output means 52. An internally threaded adapter bearing collar 66 threadably cooperates with the threaded end 64 of the elongated shaft 26 and is positioned in abutment with the shoulder 62 to hold the hub 24 in non-axial shifting position on the elongated shaft 26. Or, in the alternative, the collar 66 may not be internally threaded, but rather, a separate threaded nut may secure upon the threaded end 64, to hold the collar, and its other retained components, into their installed positions. The cone bearing 34 is mounted on the adapter bearing collar 66 and is clamped in position relative thereto by the bearing clamp 40, as previously described.

The internal overload clutch assembly 50 is mounted for cooperation with the rotating member (roller gears 22 and associated hub 24) and rotatable member (elongated shaft 26) within the housing 12. For this purpose, the internal overload clutch assembly includes drive means 70 which is attached to the rotating member for hub 24, and a driven means 72 which is attached to the rotatable member or elongated shaft 26. Th drive means 70 comprises an annular collar having a central opening for mounting on the elongated shaft 26. Clearance openings 76 are provided in the annular collar 70 for receiving the threaded fastener 78 to threadably mount and attach the drive means or annular collar 70 to the hub 24 as best seen in FIG. 2 of the drawings Additionally, the drive means or annular collar 70 includes openings 80 for receiving the connecting or coupling pins 82 which also attach the annular collar 70 to the hub 24; These pins 82 provide supplemental reinforcements for the internal overload clutch assembly during its normal operation Similarly, the driven means 72 is an annular collar having a central opening 84 for receiving the elongated shaft 26 A plurality of clearance openings 86 are provided for receiving the threaded fasteners 88 to mount and attach the annular collar 72 to the driven means or elongated shaft 26. Alternatively spaced apertures are also provided for receiving the connecting or coupling pins 92 which aid in supplemental reinforcement for the driven means or annular collar 72 during normal operation of the internal overload clutch assembly 50. As best seen in FIG. 2 of the drawings, the drive means or annular colar 70 is attached to the hub 24 in juxtaposed, non-axial shifting relationship thereto, while the driven means or annular collar 72 is attached to the elongated shaft 26 in juxtaposed and non-axial shifting relationship to the circumferentially extending and radially outwardly directed shoulder 60 of the elongated shaft In order to provide the desired coupling and uncoupling of the drive and driven means 70, 72 respectively relative to one another, axially shiftable detent means are provided. In the disclosed embodiment, the axially shiftable detent means are disclosed as roller bearing detents 94 which are received within passageways 96 circumferentially spaced about the driven means or annular collar 72 and held therewithin by the retaining ring 98 The roller bearing detents 94 are arranged to cooperate with detent seats 1 00 formed in the drive means or annular collar 70 Opposing contact with the roller bearing detents 94 is provided by the thrust bearing !02 and its associated races 104 which, in turn, are normally urged against the bearing detents 94 by the resilient means in the form of disk springs 106. A ring spacer 108 engages the disk springs 106 to adjust a predetermined amount of biasing pressure which is necessary to hold the roller detents 94 within the cooperating detent seats 100.

In the preferred embodiment, the detent seats 100 are preferably staggered around the annular collar 70 to facilitate operation of the device after it has been decoupled, thereby requiring the coupler to make at least one complete turn before the roller detents 94 simultaneously come into alignment with their respective cooperating detent seats 100. Obviously, it is also undesirable to have the drive means or annular collar 70 unimpeded to continue its turning at its relatively higher speed with respect to a motioned impeded driven means or annular collar 72, after uncoupling and one complete revolution, as previously described For this purpose, switch means 112 extend from the switch mounting bracket 114 in proximity to the disk springs 106 for de-energizing the prime mover upon disengagement of the roller detents 94 from the cooperating detent seats 100. Even though the operation is shut down in this manner, usually there is sufficient relative rotation, such that one complete revolution of the unseated roller detents 94 relative the staggered cooperating detents seats 100 will have occured, to provide for automatic resetting of the roller detents 94 within the cooperating detent seats 100.

Figure 5:
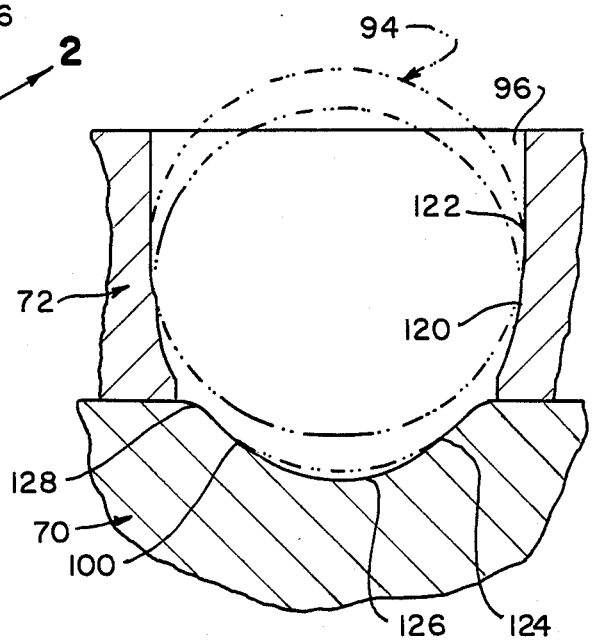
FIG. 5 is an enlarged sectional view illustrating the manner in which the cooperate with their seats in the internal overload clutch assembly.
Figure 6:
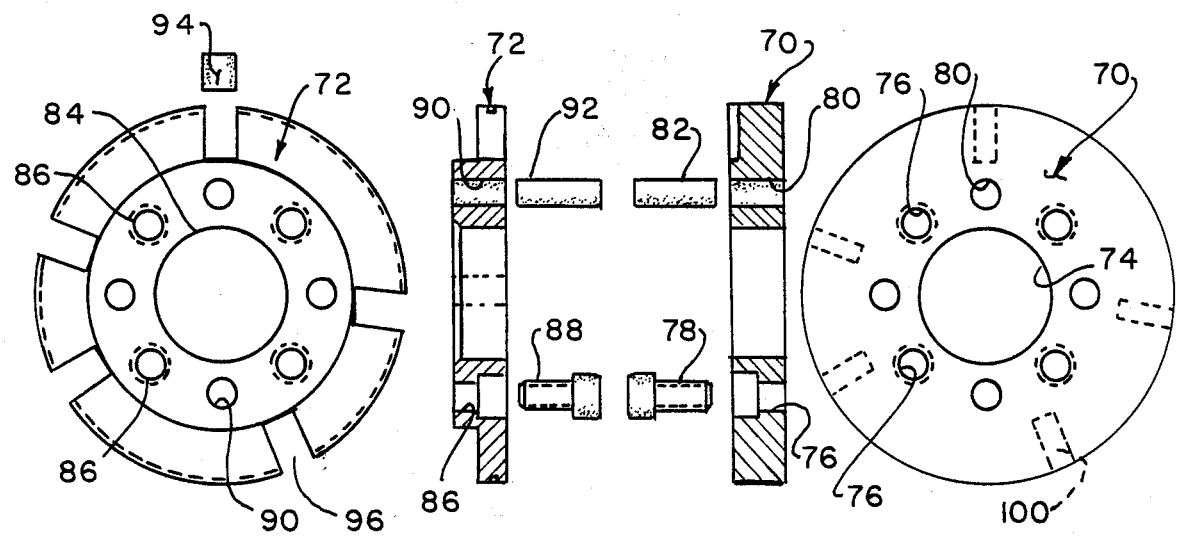
FIG. 6 is an end elevational and sectional view of the drive and driven means bearinged components of the internal clutch overload assembly of the present invention.

During the coupling and uncoupling of the drive and driven means 70, 72 respectively, the roller detent 94 moves within the passageway 96 of the driven means or annular collar 72 and unseats from the cooperating detent seats 100 of the drive means or annular collar 70. For a specific understanding of this movement, reference is made to FIG. 5 of the drawings. There, it can be seen that the roller detent 94 shown in phantom lines is supported in the driven means or annular collar 72 in a passageway which is surrounded by adjacent axially extending contoured surface portions 120, 122 that are complementary configured relative to the roller bearing detent 94. Specifically, the complementary contoured surface portion 120 adjacent the drive means or annular collar 70 has a complementary configured and contoured shaped relative to a corresponding surface portion 124 surrounding the cooperating detent seat !00 in the drive means or annular collar 70 for receiving the roller bearing detent 94 in a snug fit relationship within the complimentary configured and contoured surface portions 120, 124 of the driven and drive means 72, 70 respectively. When a predetermined excessive torque is exceeded in the rotatable member or elongated shaft 26, the roller bearing detents 94 are axially shifted against the disk springs 106, through the thrust bearing 102, in order to unseat the roller bearing detents 94 from within their cooperating detent seats 100. However, in so doing, the drive and driven means 70, 72 respectively remain in a stationary or fixed position relative to the rotating and rotatable members 24, 26 respectively. As the roller bearing detents 94 are unseated from the cooperating detent seats 100, they move into proximity relative to the other complementary contoured surface portion 122 in the driven means or annular collar 72 which is only slightly larger than the roller bearing detents 94. The seated and unseated positioning of the roller bearing detents 94 are shown by the phantom line representations in FIG. 5 of the drawings It will be further noted that each cooperating detent seat 100 includes a second contoured surface 126 spaced from the driven means 72 which is also slightly larger than the roller bearing detent 94 to provide clearance for the roller bearing detent 94. This eliminates seat bottom contact, while also insuring a good fit and proper contact with the complementary configured and contoured surface portions 120, 124 of the driven and drive means 72, 70 respectively, when the roller bearing detents 94 are seated in cooperating detent seats 100. It also prevents any lubricant from adhering or holding the bearings to their respective seats beyond the torque force set for disconnection. In addition, in order to prevent any damage to the surface of the roller bearing detents 94 as they are seated and/or unseated, a rounded corner portion 128 is provided adjacent the cooperating detent seats 100 so that no sharp edges are encountered by the roller bearing detents 94 during coupling/decoupling and reentrant.

From the foregoing, it will now be appreciated that the new and improved internal overload clutch assembly provides a unique construction and design which achieves the aforementioned and other objects and advantages of the present invention.

Variations in the design of this internal overload clutch assembly may occur to those skilled in the art upon reviewing the subject matter of this disclosure Such variations or modifications, if within the spirit of this invention, are intended to be encompassed within the scope of any patent claims issuing hereon. The description as set forth is primarily made for illustrative purposes only.

I claim:

1. A substantially enclosed overload clutch assembly for connecting rotating and rotatable members together during normal operation and for disconnecting the rotating and rotatable members when a maximum predetermined torque is exceeded, said rotatable member being rotatably mounted within an enclosed housing and having output means extending outside of said housing for performing prescribed mechanical operations, said rotating member being rotatably mounted upon said rotatable member in said housing, and being operatively connected to a power source for predetermined rotational movement thereof, said rotating member including a series of roller gears mounted upon a hub and with said roller gears being incrementally indexed by an indexing cam incorporated within said power source, said enclosed overload clutch assembly being mounted for cooperation with said rotating and rotatable members within said housing and including drive and driven means, said drive means being attached to said hub ad said driven means being attached to said rotatable member, said rotatable member comprising an elongated shaft and said clutch assembly being mounted on said elongated shaft, said roller gear hub mounted upon said elongated shaft and disposed for relative rotation thereon upon clutch disconnection, said drive means including a first annular collar means attached to said hub of the rotating member, and also rotatably mounted on said elongated shaft, said driven means including a second annular collar means attached to said rotatable member and mounted on said elongated shaft, axially shiftable detent means adjacent the second annular collar means and coupling said drive means and driven means together during normal operation to allow the rotating member to simultaneously turn the rotatable member, said axially shiftable detent means also uncoupling said drive and driven means from one another when the output means of said rotatable member encounters an excessive predetermined torque in performing the prescribed mechanical operations outside of said housing, said first annular collar means of said drive means including detent seats which engage and receive the detent means, resilient means normally biasing and holding said detent means within the cooperating detent seats, and said elongated shaft being rotatably supported at opposite ends thereof by bearing means which provide opposing angular bearing support to said elongated shaft as rotatably mounted within the enclosed housing.

2. The assembly as defined in claim 1 and including thrust bearing means interposed between said detent means and said resilient means and normally transferring the biasing force from the resilient means to said detent means.

3. The assembly as defined in claim 2 wherein said resilient means comprises disc spring means which are compressed by the detent means when axially shifting and disengagement of the detent means from the cooperating detent seats is caused by excessive predetermined torque.

4. The assembly as defined in claim 3 wherein said elongated shaft has circumferentially extending and radially outwardly directed shoulder means, and said disc spring means is interposed between said circumferentially extending and radially outwardly directed shoulder means and said thrust bearing means.

5. The assembly as defined claim 4 wherein adjustment means extends from said circumferentially extending and radially outwardly directed shoulder means for varying the amount of torque required to unseat the detent means from the cooperating detent seats.

6. The assembly as defined in claim 5 and including switch means responsive to the compression of the disc spring means for de-enerqizing the drive means upon disengagement of the detent means from the cooperating detent seats.

7. The assembly as defined in claim 6 wherein said elongated shaft has a second circumferentially extending and radially outwardly directed shoulder means axially inwardly spaced from said first circumferentially extending and radially outwardly directed shoulder means, and said enclosed overload clutch assembly including said drive and driven means being interposed between said second circumferentially extending and radially outwardly directed shoulder means and said rotating member.

8. The assembly as defined in claim 6 wherein said detent means comprises roller bearing elements.

9. The assembly as defined in claim 8 wherein each of said roller bearing elements is supported in said driven means in a passageway surrounded by adjacent axially extending contoured surface portions that are complementary configured relative to said roller bearing element one of said contoured surface portions adjacent the drive means being complementary configured relative to a corresponding surface portion surrounding the cooperating detent seat in said drive means for receiving the roller bearing element in a snug fit relationship therein, the other of said contoured surface portions in said driven means spaced away from the drive means being only slightly larger than the roller bearing element to permit movement of the roller bearing element proximate thereto when separated from the cooperating detent seat in said drive means.

10. The assembly as defined in claim 9 wherein said cooperating detent seats in said drive means further includes a contoured surface spaced from the driven means and also being so dimensioned relative to the roller bearing element to provide clearance therefor.

11. The invention of claim 1 and wherein said bearing means comprise cone bearing means.

12. The assembly as defined in claim 11 wherein there are a pair of cone bearing means, one of said cone bearing means engages said elongated shaft at one end, and said other cone bearing means engages a bearing adaptor collar mounted on the other end of said shaft for bearing mounting for rotation said rotatable member.

13. The assembly as defined in claim 12 wherein said cone bearing means are interposed between the elongated shaft and housing at the one end and between said bearing adaptor collar and said housing at the other end thereof.

14. An internal overload clutch assembly for connecting rotating and rotatable members together during normal operation and for disconnecting the rotating and rotatable members when a maximum predetermined torque is exceeded, said rotatable member being rotatably mounted within an enclosed housing and having output means extending outside of said housing for performing prescribed mechanical operations, said rotating member being rotatably mounted upon said rotatable member in said housing and being operatively connected to a power source for predetermined rotational movement thereof, said internal overload clutch assembly being mounted for cooperation with said rotating and rotatable members within said housing and including drive and driven means, said drive means being attached to said rotating member and said driven means being attached to said rotatable member, said rotatable member comprises an elongated shaft and said internal overload clutch assembly is mounted on said elongated shaft, said drive means comprises first annular collar means attached to said rotating member and rotatably mounted on said elongated shaft, said driven means comprises second annular collar means attached to said rotatable member and mounted on said elongated shaft, and axially shiftable detent means adjacent the second annular collar means couplinq said drive and driven means during normal operation and uncoupling said drive and driven means when excessive torque is encountered, the first annular collar means of said drive means includes detent seats which engage and receive the detent means resilient means normally biasing and holding said detent means within the cooperating detent seats, thrust bearing means interposed between said detent means and said resilient means and normally transferring the biasing force from the resilient means to said detent means, and said detent means comprising roller bearing elements.

15. The assembly as defined in claim 14 wherein said detent means comprises a roller bear element which is supported in said driven means in a passageway surrounded by adjacent axially extending contoured surface portions that are complementary configured relative to said roller bearing element, one of said contoured surface portions adjacent the drive means being complementary configured relative to a corresponding surface portion surrounding the cooperating detent seat in said drive means for receiving the roller bearing element in a snug fit relationship therein, the other of said contoured surface portions in said driven means spaced away from the drive means being only slightly larger than the roller bearing element to permit movement of the roller bearing element proximate thereto when separated from the cooperating detent seat in said drive means.

16. The assembly as defined in claim 15 wherein said cooperating detent seats in said drive means further includes a contoured surface spaced from the driven means and also being so dimensioned relative to the roller bearing element to provide clearance therefor.

* * * * *

UNITED STATES PATENT AND TRADEMARK OFFICE
CERTIFICATE OF CORRECTION

PATENT NO. : 4,828,095.
DATED : May 9, 1989.
INVENTOR(S) : Kilwin, Thomas C.

It is certified that error appears in the above—identified patent and that said Letters Patent is hereby corrected as shown below:

Claim 8, column 10, line 25, change "6" to ---2---.

Claim 9, column 10, line 32, after ment, insert ---,---.

Claim 14, column 11, line 23, after means, (1st occurr.) insert ---,---.

Claim 15, column 12, line 5, change "bear" to ---bearing---.

Signed and Sealed this

Twenty-sixth Day of December, 1989

Attest:

JEFFREY M. SAMUELS

Attesting Officer     Acting Commissioner of Patents and Trademarks